United States Patent Office 3,523,597
Patented Aug. 11, 1970

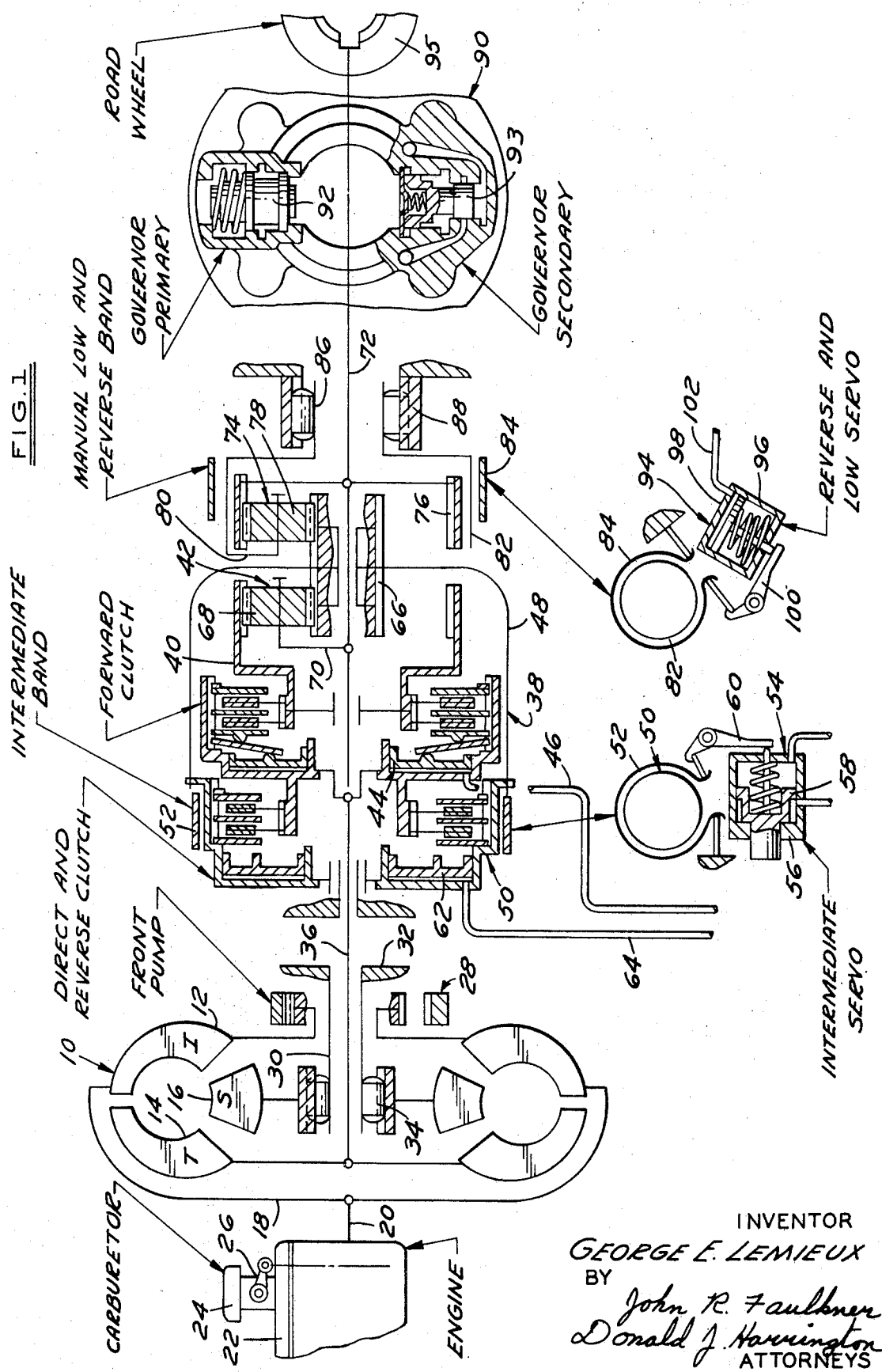

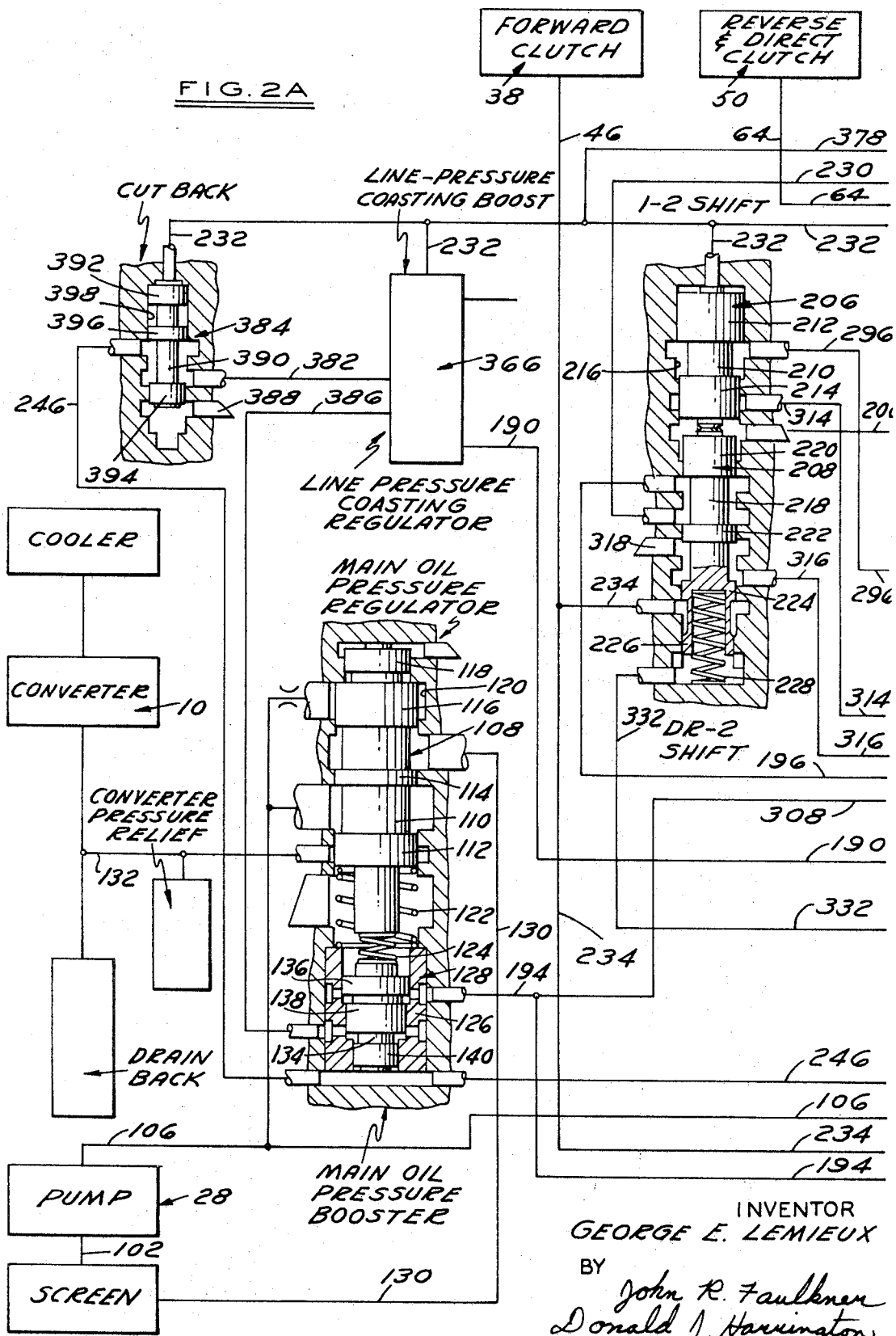

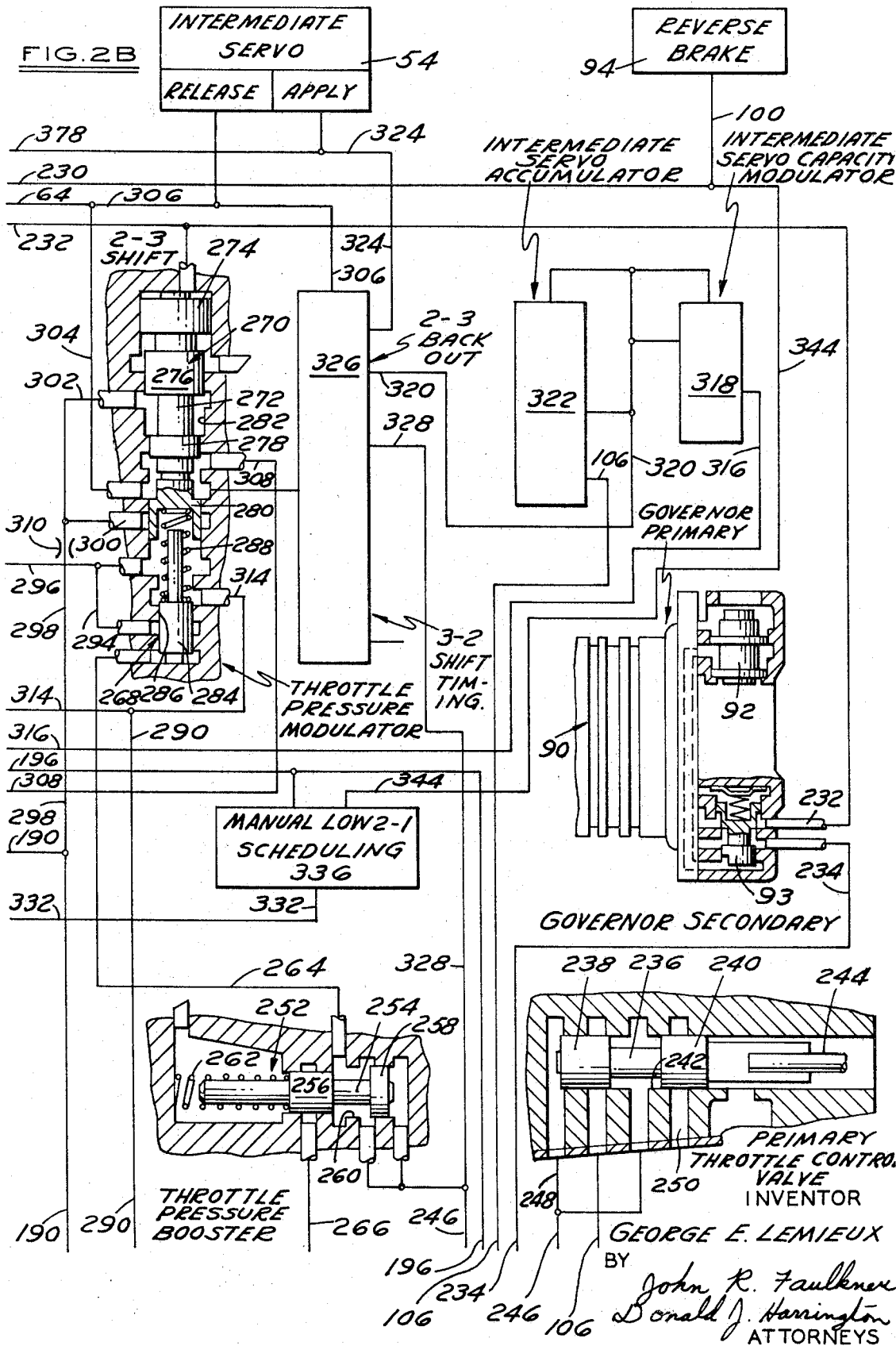

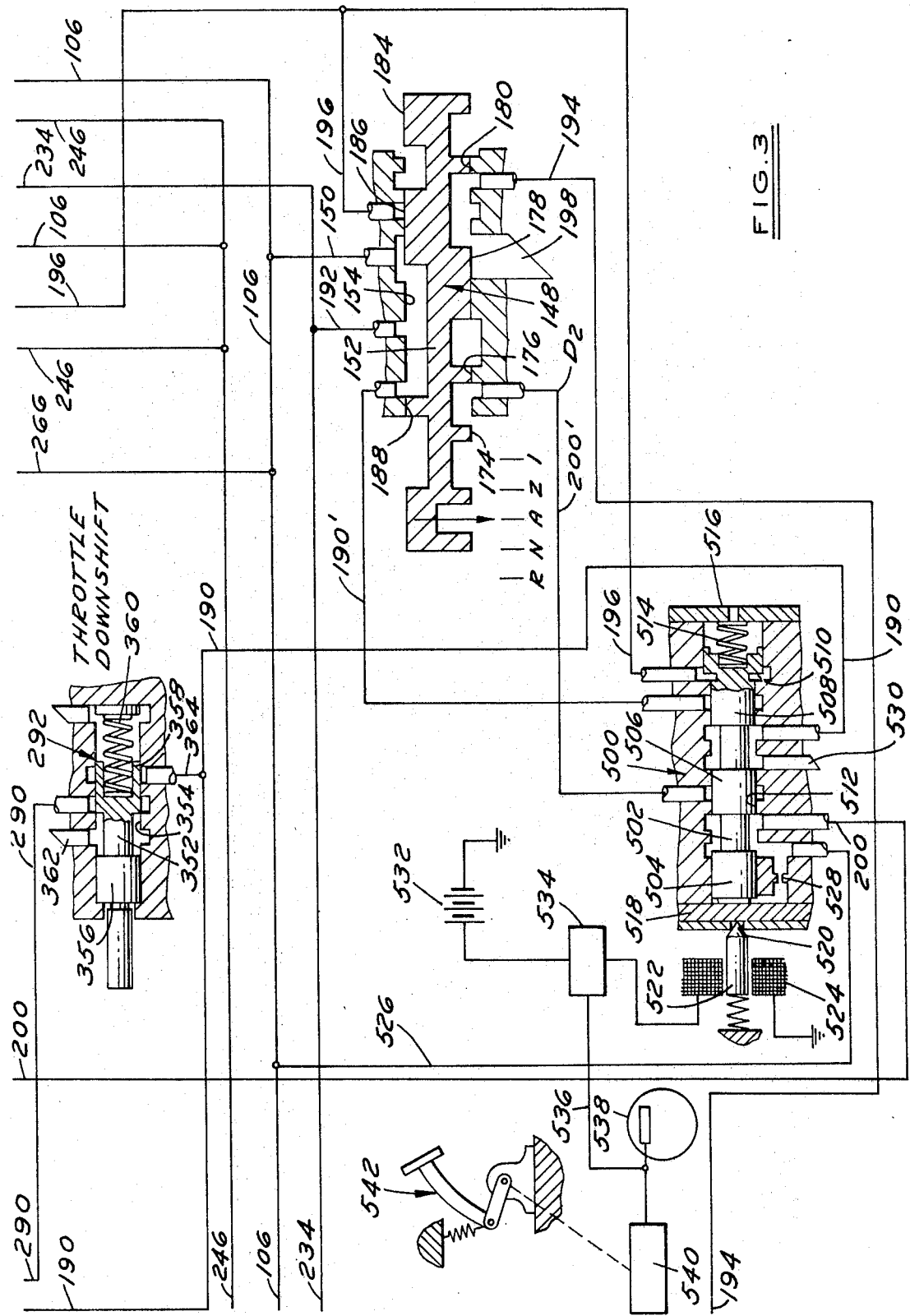

3,523,597
AUTOMATIC POWER TRANSMISSION CONTROL SYSTEM WHEREBY APPLICATION OF VEHICLE BRAKES DOWNSHIFTS THE TRANSMISSION
George E. Lemieux, Livonia, Mich., assignor to Ford Motor Company, Dearborn, Mich., a corporation of Delaware
Continuation-in-part of application Ser. No. 704,424, Feb. 9, 1968. This application Mar. 13, 1969, Ser. No. 812,547
Int. Cl. F16d 67/02; F16h 57/00
U.S. Cl. 192—4        12 Claims

ABSTRACT OF THE DISCLOSURE

This specification describes an automotive vehicle driveline having a multiple ratio power transmission mechanism with an automatic control valve system for controlling ratio changes. During coasting operation, the vehicle engine, which serves as a power source during driving under torque, acts as a brake as the transmission driven member distributes coast torque through the gear system of the transmission mechanism to the engine. Additional engine braking is accomplished by downshifting the transmission mechanism to an underdrive ratio during coasting operation as the vehicle operator applies the vehicle wheel brakes. The automatic control valve system for the transmission mechanism responds to wheel brake pressure to initiate an automatic downshift thereby assisting the wheel brakes in decelerating the vehicle.

REFERENCE TO RELATED APPLICATION

This disclosure is a continuation-in-part of U.S. patent application Ser. No. 704,424, filed Feb. 9, 1968, and now abandoned, entitled Automatic Power Transmission Control System for an Automotive Vehicle With Vehicle Wheel Brakes.

GENERAL DESCRIPTION OF THE INVENTION

The improvements of my invention can be applied readily to the transmission system shown in copending application Ser. No. 518,820, now Pat. No. 3,393,585, filed by Stanley L. Pierce on Jan. 5, 1966. That application is assigned to the assignee of my invention and reference may be had thereto for the purpose of supplementing this disclosure.

Automatic transmission mechanisms for automotive vehicle drivelines, including the Pierce mechanism, comprise gear elements that establish multiple torque delivery paths between a turbine member of a hydrokinetic torque converter and the driven shaft. The impeller of the torque converter is connected to the crankshaft of an internal combustion engine, and fluid pressure operated clutches and brakes control the relative motion of the gear elements whereby automatic speed ratio changes can be accomplished. This speed ratios include a direct drive ratio and at least one underdrive ratio.

The control system for actuating and releasing the clutches and brakes during ratio changes comprises a fluid pressure source and pressure distributor valves situated in conduit structure that connect the pressure source with fluid pressure operated servos for the clutches and brakes. The valves respond to control variables to actuate and release the clutches and the brakes in the desired sequence during the acceleration period.

One of the control variables is a pressure signal that is proportional in magnitude to engine torque. Another variable is a pressure signal that is proportional in magnitude to the driven speed of the vehicle.

When the vehicle is coasting with the engine carburetor throttle at a closed setting, a torque reversal is experienced in the driveline as the vehicle engine acts as a brake and the transmission driven shaft drives the turbine of the converter. This engine braking effect supplements the action of the vehicle wheel brakes.

The improvement of my invention comprises a valve arrangement which acts in cooperation with the transmission control valve elements to downshift the automatic transmission to an underdrive ratio when the vehicle begins to coast, thereby supplementing the braking action of the wheel brakes. This includes a downshift control valve that is sensitive to the brake pressure developed in the vehicle wheel brake cylinders as it distributes a control pressure signal to the ratio controlling valve elements of the transmission system through a downshift signal passage. When the vehicle is coasting under zero torque conditions and the wheel brake pressure exceeds a preselected value, the downshift control valve acts in cooperation with a driver operated transmission gear selector so that it is functional only during the desired operating modes chosen by the vehicle operator. It has no influence on the automatic ratio changing tendencies of the valve system during a normal acceleration period.

BRIEF DESCRIPTION OF THE FIGURES OF THE DRAWING

FIG. 1 shows in schematic form a gearing arrangement capable of using the improved control system of my invention.

FIGS. 2A, 2B show in schematic form a valve circuit including the improvements of my invention.

FIG. 3 is an enlargement of a portion of the control circuitry of FIGS. 2A and 2B.

PARTICULAR DESCRIPTION OF THE INVENTION

FIG. 1, numeral 10 designates a hydrokinetic torque converter unit which comprises an impeller 12, a turbine 14 and a stator 16. The converter members are bladed and they are situated in toroidal, fluid flow relationship in a common torus circuit. Stator 16 changes the tangential component of the absolute fluid flow velocity vector of the fluid that leaves the turbine thereby creating a hydrokinetic torque reaction. This reaction is distributed to a portion of the housing 32 through an overrunning coupling 34 and a stationary stator sleeve shaft 30. Coupling 34 inhibits rotation of the stator in a direction opposite to the direction of rotation of the turbine and the impeller, but freewheeling motion in the other direction is permitted when the converter acts as a fluid coupling.

The impeller 12 is connected by means of a drive shell 18 to the crankshaft 20 for an internal combustion vehicle engine 22. The engine includes an air-fuel mixture intake manifold that is supplied with a combustible mixture by a carburetor 24. An engine carburetor throttle valve, shown in part at 26, controls the flow of combustible mixture to the engine intake manifold.

A positive displacement fluid pump 28, which serves as a pressure source for the conduit structure shown in FIGS. 2A, 2B and 3, is drivably connected to the impeller 18 and is effective to supply fluid pressure whenever the engine is operating. Pump 28 acts as a pressure source for the control system that will be described with reference to FIGS. 2A, 2B and 2C.

The turbine 14 is connected to a turbine shaft 36, which in turn may be connected to a ring gear 40 for a first simple planetary gear unit 42. A selectively engageable forward clutch 38 is provided for the purpose of establishing and interrupting the connection between shaft 36 and ring gear 40. Forward clutch 38 includes an internally splined clutch drum that defines an annular cylinder within which an annular piston 44 is situated. This annular piston and the annular cylinder cooperate to define a pressure cavity that is supplied with actuating fluid pressure by means of a feed passage 46. A drive shell 48 is connected to a clutch drum for a direct and reverse clutch 50.

A brake band 52 surrounding the drum may be applied and released selectively by means of an intermediate servo shown in FIG. 1 at 54. The servo includes a cylinder that receives a piston 58. The cylinder and the piston cooperate to define a pair of opposed fluid pressure chambers that may be supplied with actuating fluid by means of separate pressure feed passages as will be seen in the subsequent description. The pressure force acting upon piston 58 is transferred to the operating end of brake band 52 by means of a motion transmitting brake lever 60. The other end of the brake band 52 is anchored in a conventional fashion.

The drum for the direct and reverse clutch 50 defines an annular cylinder within which is received an annular piston 62. This piston and its cooperating cylinder define a working chamber that is supplied with fluid by means of a pressure feed passage 64.

The simple planetary gear unit 42 includes also a sun gear 66 which meshes with a set of planet pinions 68. These pinions are rotatably carried by a carrier 70, which is connected directly to a power output shaft 72.

Sun gear 66 forms also a part of a second simple planetary gear unit 74. This gear unit includes also a ring gear 76 and a set of planet pinions 78, the latter being journalled rotatably on a carrier 80. Carrier 80 defines a brake drum 82 which in turn carries brake discs of a manual low and reverse brake 84. The driving torque reaction on the carrier is accommodated by means of an overrunning coupling having brake rollers 86. These rollers are disposed between an inner race, that is common to the carrier 80, and an outer race 88, the latter being cammed to provide cam surfaces that cooperate with the rollers 86 to inhibit rotation of the carrier 80 in one direction, although freewheeling motion of the carrier 80 in the opposite direction is permitted. Race 88 is secured fast to the transmission housing.

A fluid pressure governor valve assembly 90 is drivably carried by power output shaft 72. It includes a primary governor valve 92 and a secondary governor valve 93, each valve being situated on opposed sides of the axis of rotation of the shaft 72. As will be explained subsequently, the primary governor valve inhibits the modulating action of the secondary governor valve at speeds of rotation of the shaft 72 that are less than a predetermined value. At any speed greater than that predetermined value, the secondary governor valve is effective to establish a pressure signal that is proportional in magnitude to the speed of rotation of the shaft 72. The signal may be utilized by the automatic control valve system that will be described subsequently.

Shaft 72 can be connected to the vehicle road wheels 95 through a driveshaft and differential and axle assembly.

The discs of brake 84 are applied and released by means of a fluid pressure operated servo 94. The servo includes a cylinder 96 within which is positioned a fluid pressure operated piston 98. Cylinder 96 and piston 98 define a pressure chamber that can be supplied with control pressure through a feed passage 100. The fluid pressure force acting upon the piston 98 is transferred to the operating end of the brake band 84 by means of a disc brake pressure ring shown at 100. The cylinder 96 is defined by the relatively stationary transmission housing.

The transmission mechanism may be conditioned for continuous operation in the lowest speed ratio by appropriately adjusting a manual valve to the low speed ratio position as will be explained subsequently. This causes fluid pressure to be distributed to the pressure chamber for the reverse and low servo. The forward clutch 38 is applied during operation in the forward drive range in any speed ratio. If both the brake 84 and the clutch 38 are applied, the turbine torque delivered to the turbine shaft 36 is distributed through the engaged forward clutch 38 to ring gear 40. The driven shaft 72 to which the carriers 70 and 80 are connected tends to resist rotation. Thus, there is a tendency for sun gear 66 to rotate in a direction opposite to the direction of rotation of shaft 36. This, then, tends to cause carrier 80 to rotate in the same direction as the direction of rotation of sun gear 66. It is inhibited from doing so, however, both by the overrunning brake shown in part at 86 and also by the engaged brake 84. The torque acting on the ring gear 76 then is in a forward driving direction. It supplements the driving torque of the carrier 70 so that a split torque delivery path is provided between the shaft 36 and the shaft 72.

Drive shell 48 which is connected directly to the sun gear 66 can be braked by applying the intermediate servo, thus establishing intermediate speed ratio operation. Under these conditions, the brake 84 is released while the clutch 38 remains applied. Clutch 50, of course, is released. The sun gear 66 functions as a reaction member during such intermediate speed ratio operation, and the driving torque delivered to the ring gear 40 is multiplied by the first planetary gear unit 42. The overall speed ratio then is greater than the lowest speed ratio, but it is less than unity. The overrunning coupling shown in part at 86 freewheels during this speed ratio change from the lowest speed ratio to the intermediate speed ratio.

To condition the mechanism for operation in the lowest speed ratio during normal acceleration from a standing start, it is not necessary to apply brake 84. The overrunning brake shown in part at 86 accommodates the forward acting torque. Upon application of the intermediate speed ratio brake band 52, an automatic pickup shift from the lowest speed ratio to the highest speed ratio is obtained. This is accomplished by the engagement of a single friction torque establishing device without the necessity for engaging or releasing a second friction torque establishing device in the system.

A speed ratio change from the intermediate speed ratio to the direct drive, high speed ratio is accomplished by releasing brake band 52 and applying both clutches 38 and 50 simultaneously. Brake band 52 is released by distributing pressure to the right-hand side of the piston 58. The band 52 is released when both pressure chambers of the intermediate servo 54 are pressurized. A direct drive connection between shaft 36 and 72 then is provided as the elements of the gear units are caused to rotate in unison.

The control circuit shown in FIGS. 2A, 2B and 3 control automatic speed ratio changes in the transmission structure of FIG. 1. The transmission mechanism can be conditioned by the valve system during engine braking operations with the engine acting as a brake and during acceleration under torque. This valve system contains elements that are common to the circuit of Pat. No. 3,309,939, filed Jan. 21, 1965, which also is assigned to the assignee of my present invention.

In FIGS. 2A and 2B the ratio changing control elements have been indicated by reference characters that are identical to the corresponding elements of the circuit shown in application Ser. No. 518,820, now Pat. No. 3,393,585. The circuit functions of the various elements will not be described here in the same detail in which they were described in my copending application. The improved control functions and the structure of the downshift control valve circuitry will be described in detail, however, especially with reference to FIG. 3. The reference numerals used in FIGS. 2A and 2B are common to my copending application.

The transmission mechanism is capable of establishing a reverse drive condition, a neutral condition, an automatic drive range condition, a second gear hold condition and a first gear hold condition. These various drive conditions correspond to the detent positions of the transmission gear selector shown at 148. These positions are indicated, respectively, by the reference notations R, N, A, 2, and L. When the transmission gear selector 148 is positioned in the automatic drive range position A, the control valve circuitry responds to control variable to initiate ratio changes automatically. If the transmission gear selector is positioned at the number 2 position, the transmission mechanism will operate continuously in the intermediate speed ratio with no upshifting or downshifting. If the vehicle is accelerated from a standing start with the gear selector in the number 1 position, the transmission will remain in the lowest speed ratio and no upshifting will occur. These circuit functions are described in application S.N. 518,820 now Pat. No. 3,393,585.

The downshift control valve which establishes a down shift from the high speed ratio to the intermediate, underdrive ratio when the vehicle operator applies pressure to the wheel brake pedal, is identified in FIG. 3 by reference character 500. It includes a valve spool 502 with spaced lands 504, 506 and 508. Land 508 is provided with a differential area indicated at 510. The valve element 502 is slidably positioned in valve chamber 512 having internal valve lands that register with the external valve lands on the valve element 502. Valve spring 514 which is seated on valve plate 516 urges normally the valve element 502 in a left-hand direction as viewed in FIG. 3. An orifice plate 518 closes the left-hand end of the valve chamber 512. It includes a control orifice 520 with which valve element 522 registers. Valve element 522 may be connected mechanically to the movable armature of a solenoid having windings 524. When the windings are energized, valve element 522 seals the control orifice 520.

When the transmission gear selector valve element 152 is moved to the reverse drive position, passages 194 and 196 are pressurized. At that time, the pressure passes from passage 150 through the space between lands 184 and 186 to the passage 196. Passage 196 communicates with passage 194 through the annulus in the chamber 154 directly adjacent the point at which passage 196 is connected to the chamber 154.

If the gear selector 148 is adjusted to the automatic drive range position A, passage 234 is pressurized as pressure passes from passage 150 to the passage 192 through the space between lands 188 and 186. This is the condition illustrated in FIG. 3. Passage 190' also is pressurized since it also communicates with the passage 150 through the space between lands 188 and 186. Passage 234 is pressurized whenever the selector valve is moved to the automatic drive range position, the number 2 position, or the number 1 position. It communicates directly with a lower drive clutch 38. Passage 190', however, is pressurized only when the selector valve is moved to the automatic drive range position A.

When the manual valve is shifted to the number 2 position, passage 200' is pressurized as pressure is distributed to it from passage 526 through the downshift control valve chamber 502 and through the annular space between lands 504 and 506. This occurs whenever the downshift control valve 502 is in a right-hand position. Passage 200' is exhausted, however, to provide an exhaust flow path for passage 200 when the gear selector valve element 152 assumes the automatic drive range position as shown in FIG. 3. It is also exhausted when it assumes the number 1 position.

Passage 200' communicates with passage 526 through the valve chamber 512 when the manual valve element 502 is shifted to the right.

If the gear selector valve is moved to the number 1 position, passage 196 is pressurized as the mechanism is conditioned for continuous operation of the low speed ratio.

Downshift control valve 500 includes a pressure chamber on the left-hand side of the valve element 502. This chamber communicates with passage 526 through flow-restricting orifice 528. Control orifice 520 communicates with the exhaust region. Thus, when the valve element 522 seals the control orifice 520, a pressure built-up occurs on the left-hand side of the valve element 502 thereby shifting it to the right-hand position. Prior to that time, passage 526 communicates with downshift signal passage 200 so that control pressure from main control line 106 passes through passage 526 and through the downshift control valve and passage 200 to the upper end of the DR2 shift valve. This, of course, causes the DR2 shift valve to move to the upshift position. Passage 190 is exhausted through the space between lands 506 and 508 in the downshift control valve and through exhaust port 530. Passage 190 serves as a pressure feed passage for the 2–3 shift valve. Thus, it is impossible to accomplish a 2–3 upshift. When the passage 196 is pressurized as the transmission is conditioned for operation in either low or reverse, control pressure is distributed to annular area 510. This holds the downshift control valve element 502 in a right-hand position against the force of spring 514.

Movement of the valve element 502 between the left-hand position and the right-hand position is controlled by the valve element 522. When valve element 522 seals the orifice 520, the resulting pressure build-up in the valve chamber 512 at the left-hand end of the valve element 502 shifts the latter in a right-hand direction. If the valve element 522 opens a control orifice 520 to the exhaust region, valve element 502 shifts in a left-hand direction thereby forcing the automatic control valve to assume the intermediate ratio underdrive condition.

The solenoid windings 524 are connected to a voltage source such as battery 532 through a pressure switch 534. The pressure switch 534 is connected by means of fluid conduit 536 to the wheel brake cylinder 538 for the vehicle wheel brakes. Master brake cylinder 540 supplies control pressure to the wheel brake cylinders 538 and to the conduit 536. Master brake cylinder 530 in turn is pressurized upon movement of the brake pedal 542 by the vehicle operator to the vehicle braking position.

When the braking pressure in the conduit 536 reaches a precalibrated value, pressure switch 534 closes the circuit between battery 532 and the solenoid windings 524. This moves the valve element 522 to the exhaust position thereby relieving the pressure on the left-hand side of the valve land 504. If, at that time, pressure in conduit 196 is exhausted, the valve element 502 will shift in the left-hand direction. This will cause the transmission to complement the braking action of the wheel brakes as the vehicle decelerates during coasting.

This engine braking characteristic will continue with the transmission in the intermediate underdrive ratio until the vehicle operator relieves the braking pressure in conduit 536. When this is done, the circuit for the solenoid winding again is opened thereby permitting the valve 522 to move under spring force and to register with the orifice 520. This results again in a pressure build-up in the chamber on the left-hand side of the valve element 502. This returns the downshift control valve to the inactive position.

Having thus described a preferred form of my invention, what I claim and desire to secure by U.S. Letters Patent is:

1. In an automotive vehicle driveline having an internal combustion engine and multiple speed ratio gearing adapted to establish plural torque delivery paths between the engine and a driven member, clutch and brake means for controlling the relative motion of said gear elements to initiate speed ratio changes, fluid pressure operated servos for actuating and releasing said clutch and brake means, a fluid pressure source, conduit structure connecting said pressure source and said servo means, pressure distributor valves in said conduit structure and partly defining the same for controlling selectively distribution of actuating pressure to said servo, ratio selector valve means between said pressure source and said pressure distributor valve means for pressurizing and exhausting selectively separate regions of said conduit structure to condition said mechanism for each of several operating modes, downshift control valve means in fluid communication with said pressure distributor valve means and with said selector valve means, said downshift control means having a two-position valve element sliding situated in valve chamber, said two-position valve element, when it is in one position, being effective to control distribution of a pressure signal from said selector valve means to said distributor valve means whereby the latter is caused to assume an underdrive ratio condition, a pressure chamber at one end of said downshift control valve means, a control orifice in fluid communication with said pressure chamber, an orifice valve having an orifice valve element registering with said control orifice, said vehicle including fluid pressure operated wheel brakes, and servo means responsive to a predetermined increase in the pressure applied to said wheel brakes for actuating said orifice valve whereby said downshift control valve responds to a predetermined braking effort to condition said gearing for underdrive operation thereby assisting in the total vehicle braking effort.

2. The combination as set forth in claim 1 wherein said selector valve means is connected to said pressure distributor valve means through a downshift signal passage, said signal passage being defined in part by said downshift control valve, said selector valve means, when it is in one position, pressurizing said signal passage to condition said transmission mechanism for underdrive operation regardless of the position of said downshift control valve means.

3. The combination as set forth in claim 1 wherein said downshift control valve is in direct communication with said pressure source and is in direct communication with said distributor valve means through a signal passage, said downshift control valve, when it assumes one position, establishing direct communication between said pressure source and said signal passage.

4. The combination as set forth in claim 2 wherein said downshift control valve is in direct communication with said pressure source and is in direct communication with said distributor valve means through a signal passage, said downshift control valve, when it assumes one position, establishing direct communication between said pressure source and said signal passage.

5. The combination as set forth in claim 1 wherein said orifice element registers with said control orifice to seal the same, a connection between a high pressure region of said conduit structure and said pressure chamber including a flow-restricting orifice, electrical solenoid actuator means for withdrawing said orifice valve element out of registry with respect to said control orifice when it is energized, an electrical voltage source, a connection between said solenoid windings and said voltage source including a pressure switch, said pressure switch being connected hydraulically to said pressure operated wheel brakes whereby said solenoid windings are energized when the braking pressure exceeds a predetermined value thus conditioning said transmission mechanism for underdrive operation to assist the vehicle wheel brakes in decelerating the vehicle.

6. The combination as set forth in claim 2 wherein said orifice valve element registers with said control orifice to seal the same, a connection between a high pressure region of said conduit structure and said pressure chamber including a flow-restricting orifice, electrical solenoid actuator means for withdrawing said orifice valve element out of registry with respect to said control orifice when it is energized, an electrical voltage source, a connection between said solenoid windings and said voltage source including a pressure switch, said pressure switch being connected hydraulically to said pressure operated wheel brakes whereby said solenoid windings are energized when the braking pressure exceeds a predetermined value thus conditioning said transmission mechanism for underdrive operation to assist the vehicle wheel brakes in decelerating the vehicle.

7. The combination as set forth in claim 3 wherein said orifice valve element registers with said control orifice to seal the same, a connection between a high pressure region of said conduit structure and said pressure chamber including a flow-restricting orifice, electrical solenoid actuator means for withdrawing said orifice valve element out of registry with respect to said control orifice when it is energized, an electrical voltage source, a connection between said solenoid windings and said voltage source including a pressure switch, said pressure switch being connected hydraulically to said pressure operated wheel brakes whereby said solenoid windings are energized when the braking pressure exceeds a predetermined value thus conditioning said transmission mechanism for underdrive operation to assist the vehicle wheel brakes in decelerating the vehicle.

8. The combination as set forth in claim 4 wherein said orifice valve element registers with said control orifice to seal the same, a connection between a high pressure region of said conduit structure and said pressure chamber including a flow-restricting orifice, electrical solenoid actuator means for withdrawing said orifice valve element out of registry with respect to said control orifice when it is energized, an electrical voltage source, a connection between said solenoid windings and said voltage source including a pressure switch, said pressure switch being connected hydraulically to said pressure operated wheel brakes whereby said solenoid windings are energized when the braking pressure exceeds a predetermined value thus conditioning said transmission mechanism for underdrive operation to assist the vehicle wheel brakes in decelerating the vehicle.

9. In an automotive vehicle driveline having an internal combustion engine and multiple speed ratio gearing adapted to establish plural torque delivery paths between the engine and a driven member, clutch and brake means for controlling the relative motion of said gear elements to initiate speed ratio changes, fluid pressure operated servos for actuating and releasing said clutch and brake means, a fluid pressure source, conduit structure connecting said pressure source and said servo means, pressure distributor values in said conduit structure and partly defining the same for controlling selectively distribution of actuating pressure to said servo, ratio selector valve means between said pressure source and said pressure distributor valve means for pressurizing and exhausting selectively separate regions of said conduit structure to condition said mechanism for each of several operating modes, downshift control valve means in fluid communication with said pressure source, said downshift control means having a two-position valve element slidably situated in a valve chamber, said two-position valve element, when it is in one position, being adapted to control distribution of a pressure signal from said pressure source to said distributor valve means whereby the latter is caused to assume an underdrive ratio condition, a pressure chamber at one end of said downshift control valve means, a control orifice in fluid communication with said pressure chamber, an orifice valve having an orifice valve element registering with said control orifice, said vehicle including fluid pressure operated wheel brakes, and servo means responsive to a predetermined increase in the pressure applied to said wheel brakes for actuating said orifice valve whereby said downshift control valve responds to a predetermined braking effort to condition said gearing for underdrive operation thereby assisting in the total vehicle braking effort.

10. The combination as set forth in claim 9 wherein said downshift control valve is in direct communication with said pressure source and is in direct communication with said distributor valve means through a signal passage, said downshift control valve, when it assumes one position, establishing direct communication between said pressure source and said signal passage.

11. The combination as set forth in claim 9 wherein said selector valve means is connected to said pressure distributor valve means through a downshift signal passage, said signal passage being defined in part by said downshift control valve, said selector valve means, when it is in one position, pressurizing said signal passage to condition said transmission mechanism for underdrive operation regardless of the position of said downshift control valve means.

12. The combination as set forth in claim 11 wherein said downshift control valve is in direct communication with said pressure source and is in direct communication with said distributor valve means through a signal passage, said downshift control valve, when it assumes one position, establishing direct communication between said pressure source and said signal passage.

References Cited
UNITED STATES PATENTS

| | | |
|---|---|---|
| 2,872,000 | 2/1959 | Herndon et al. |
| 3,309,939 | 3/1967 | Pierce _____ 74—864 |
| 3,393,585 | 7/1968 | Pierce _____ 74—864 |

MARK M. NEWMAN, Primary Examiner

A. D. HERRMANN, Assistant Examiner